(12) United States Patent
Eglin

(10) Patent No.: US 7,461,819 B2
(45) Date of Patent: *Dec. 9, 2008

(54) METHOD FOR USING A STEERABLE TALL FIN TO REDUCE THE VIBRATION GENERATED ON THE FUSELAGE OF A HELICOPTER

(75) Inventor: Paul Eglin, Aix En Provence (FR)

(73) Assignee: Eurocopter, Marignane (FR)

( * ) Notice: Subject to any disclaimer, the term of this patent is extended or adjusted under 35 U.S.C. 154(b) by 237 days.

This patent is subject to a terminal disclaimer.

(21) Appl. No.: 11/019,633

(22) Filed: Dec. 23, 2004

(65) Prior Publication Data

US 2006/0097104 A1 May 11, 2006

(30) Foreign Application Priority Data

Dec. 23, 2003 (FR) .................................. 03 15299

(51) Int. Cl.
*G05D 1/00* (2006.01)
*B64C 13/00* (2006.01)
*B64C 11/00* (2006.01)
*B64C 27/78* (2006.01)

(52) U.S. Cl. .................... 244/195; 244/174; 244/17.13; 244/17.19; 244/87; 244/91

(58) Field of Classification Search .............. 244/17.13, 244/17.19, 17.27, 76 R, 76 C, 194, 195; 701/3, 701/10

See application file for complete search history.

(56) References Cited

U.S. PATENT DOCUMENTS

| | | | | |
|---|---|---|---|---|
| 2,832,551 A | * | 4/1958 | Gille ........................... | 244/191 |
| 2,985,409 A | * | 5/1961 | Atwood et al. .............. | 244/191 |
| 2,998,210 A | * | 8/1961 | Carter, Jr. .................... | 244/177 |
| 3,721,404 A | * | 3/1973 | Albert ....................... | 244/17.19 |
| 4,213,584 A | * | 7/1980 | Tefft et al. ............... | 244/17.13 |
| 4,462,559 A | * | 7/1984 | Garza ...................... | 244/17.19 |
| 4,598,887 A | * | 7/1986 | Jordan ..................... | 244/17.11 |
| 4,814,764 A | * | 3/1989 | Middleton ................ | 340/967 |
| 5,072,893 A | * | 12/1991 | Chakravarty et al. ...... | 244/76 R |
| 5,082,207 A | | 1/1992 | Tulinius | |
| 5,108,044 A | * | 4/1992 | Weiner et al. ............ | 244/17.19 |
| 5,224,667 A | * | 7/1993 | Lacabanne .................. | 244/191 |
| 5,316,240 A | * | 5/1994 | Girard et al. ............. | 244/17.27 |
| 5,375,794 A | * | 12/1994 | Bleeg ....................... | 244/76 C |

(Continued)

FOREIGN PATENT DOCUMENTS

| | | |
|---|---|---|
| FR | 2 678 578 | 1/1993 |
| FR | 2 737 181 | 1/1997 |
| FR | 2 747 099 | 10/1997 |

*Primary Examiner*—Michael R Mansen
*Assistant Examiner*—Joshua J Michener
(74) *Attorney, Agent, or Firm*—Young & Thompson

(57) ABSTRACT

A method and a device reduces the vibration generated on the structure 17 of a helicopter 2 by the flow of air through the main rotor 5 and by the flow of air along the fuselage 3. The device 1 includes: at least one sensor 18, 19, 20 measuring the vibration generated on the structure 17; and computer element 30 responsive to the vibration measurements to determine variation in the angle of incidence of a tail fin 9 of the helicopter 2 suitable for generating an opposing force $\vec{T1}, \vec{T2}$ for opposing the vibration, and transmitting the variation in angle of incidence as determined in this way to a control system 10 for controlling the angle of incidence of the tail fin 9.

11 Claims, 2 Drawing Sheets

U.S. PATENT DOCUMENTS

| | | | |
|---|---|---|---|
| 5,388,785 A * | 2/1995 | Rollet et al. | 244/17.19 |
| 5,669,582 A * | 9/1997 | Bryant et al. | 244/76 C |
| 5,816,533 A * | 10/1998 | Krysinsky | 244/17.13 |
| 5,895,012 A * | 4/1999 | Krysinski et al. | 244/17.13 |
| 6,416,017 B1 * | 7/2002 | Becker | 244/76 C |
| 6,915,989 B2 * | 7/2005 | Najmabadi et al. | 244/195 |
| 6,986,483 B2 * | 1/2006 | Kubica | 244/76 R |
| 7,017,857 B2 * | 3/2006 | Hill et al. | 244/17.13 |

* cited by examiner

METHOD FOR USING A STEERABLE TALL FIN TO REDUCE THE VIBRATION GENERATED ON THE FUSELAGE OF A HELICOPTER

The present invention relates to a method and to a device for reducing the vibration generated on the structure of a helicopter both by the flow of air coming from the main rotor which serves to provide lift and propulsion to the helicopter and by the flow of air along its fuselage.

BACKGROUND OF THE INVENTION

It is known that when the main rotor turns, it sucks in air from upstream and blows it out downstream like a propeller, thereby allowing the helicopter to fly up and down. When flying forwards, the rotor acts both as a propeller and as a wing. As a propeller it accelerates the mass of air that passes through it so as to create a moving slipstream, with the pressure and the speed of the air varying along said slipstream. Acting as a wing, the rotor causes the slipstream to be deflected.

The stream of air downstream from the main rotor, commonly referred to as the "slipstream", is disturbed in part by the main elements for rotating the main rotor and by certain fairings, or indeed the helicopter fuselage itself, in particular when carrying external loads or during special flight configuration.

The main rotor is set into rotation by a driving force applied to its shaft. For this purpose, the engine on board the helicopter drives the shaft via an appropriate mechanical assembly. This leads to equal and opposite torque being applied to the fuselage, and this torque needs to be compensated by means of an auxiliary device such as a tail rotor, which is generally also driven by the same engine.

In addition the fuselage and the rotors, it is also known that a helicopter also includes one or more substantially horizontal stabilizers and one more substantially vertical tail fins. These elements are for the most part located at the rear of the fuselage and serve to provide the helicopter with control, stability, and the ability to maneuver about two perpendicular axes. It should be observed that the horizontal stabilizers and the tail fin may sometimes be constituted in the form of a single assembly of T-shape or of cross-shape (+). Similarly, the vertical tail fin may be formed by a single aerodynamic surface or it may be in the form of two aerodynamic surfaces forming a V-shape, for example. Another solution consists in placing a substantially vertical tail fin at the outside end of a substantially horizontal stabilizer. Nevertheless, these examples are not limiting.

The tail fin and the stabilizer are generally stationary and are consequently located at the rear end of the fuselage (in a zone referred to as the "tail boom" by the person skilled in the art), and they are to be found in a zone which is subjected at least in part to the air flow or slipstream coming from the main rotor and from the fuselage.

In practice, the main rotor acts like an aerodynamic exciter. Thus, its slipstream is turbulent. Turbulence corresponds to variations in pressure, speed, and angle of incidence of the aerodynamic flow that are distributed over quite a broad range of relatively high frequencies.

The slipstream behind the main rotor of a helicopter is pulsed at a fundamental frequency equal to the product $b \times \Omega$ where $\underline{b}$ is the number of blades of the main rotor and $\Omega$ is the speed of rotation of said rotor.

Nevertheless, frequencies which are harmonics of $b \times \Omega$ can sometimes also appear.

Under such conditions, the tail fin and the stabilizer are subjected simultaneously to said aerodynamic excitation which leads directly to exciting resonant modes of the helicopter structure. This phenomenon is generally known as "tail shake".

Furthermore, during certain stages of flight (e.g. during quartering flight), it is possible that the "tail shake" phenomenon is caused not by the slipstream from the main rotor but by the slipstream from the fuselage. A helicopter fuselage often carries external items (winches, missiles, torpedoes, auxiliary tanks, . . . ) which have the effect of spoiling (increasing drag and turbulence) the air flow from the fuselage itself. The turbulence which is the main cause of said tail shake can be small or negligible during nominal flight (cruising flight in a calm atmosphere), but can become much stronger during certain stages of flight (quartering flight, flight in a turbulent atmosphere, . . . ).

Even if the aerodynamic excitation is relatively small, it can lead to a level of vibration that is disagreeable in the cockpit and in the passenger cabin and that is harmful for the structure as a whole and for the mechanical elements of the helicopter.

The vibration as generated in this way can be distributed over the various axes of the structure as a function of where the slipstream strikes. For example, if it is applied to the vertical tail fin, that will generate an effect that is mainly lateral, and in particular it will excite a first mode of resonance in lateral bending of the tail boom. Conversely, if the slipstream reaches the horizontal stabilizer, then the vibration will be mainly vertical, thereby exciting the first resonant mode of the tail boom in vertical bending.

The various kinds of vibration due to the first lateral and/or vertical bending mode of the structure of the helicopter, and possibly also to a resonant mode in twisting of the helicopter, all present numerous drawbacks, including the following:

a reduction in crew and passenger comfort;

material and equipment fatigue; and problems associated with operating on-board equipment such as weapons systems when the helicopter is fitted therewith.

In an attempt to provide a solution to this problem, documents FR 2 737 181 and U.S. Pat. No. 5,816,533 disclose a method and a device for generating an effect that opposes vibration by applying alternating variation to the pitch of the blades of the tail rotor of the helicopter.

Nevertheless, it has been found that the solution according to those patents FR 2 737 181 and U.S. Pat. No. 5,816,533 presents a first drawback associated with the fact that the aerodynamic excitation leads to excitation of resonant modes of the fuselage structure, and the blades of the tail rotor are controlled in order to reduce the vibration that results therefrom at certain particular points of the helicopter. Unfortunately, that action tends to shift the vibration nodes and antinodes along the structure, but without thereby eliminating excitation of the resonant modes of said structure.

As a result, the tail fin and the horizontal stabilizer, in particular, are subjected to the bending of the structure where they are attached thereto, depending on the way the structure responds to the excitation.

A second drawback of the system described in those patents lies in an increase in the level of noise that is generated because of the variations in the characteristic parameters (speed, pressure, . . . ) of the air flow through the tail rotor as generated by varying the angle of incidence of its blades. These effects are harmful for the environment and raise severe problems in terms of regulations.

It should also be observed, by way of example, that another drawback due to changing the angle of incidence of the blades of the tail rotor for opposing the above-mentioned vibration lies in said variations in the angle of incidence of the blades of said rotor generally generating alternating forces and moments which reduce the lifetime of the assembly of parts constituting the rotor and the means for driving it in rotation.

OBJECTS AND SUMMARY OF THE INVENTION

An object of the present invention is to remedy those drawbacks. It provides a method making it possible to reduce or even eliminate in simple and effective manner the vibration that is generated on the structure of a helicopter by the air flow or slipstream through the main rotor for providing lift and propulsion to said helicopter, and/or by the air flow along the fuselage, said helicopter including at least one tail fin that is steerable, at least in part, a fuselage, a main lift and propulsion rotor, and where appropriate a tail rotor with variable pitch blades.

To this end, said method of the invention is remarkable in that it comprises:

a) measuring the generated vibration at at least one location on the structure of the helicopter;

b) on the basis of said measurements, determining a variation in the angle of incidence of at least a portion of the tail fin that is suitable for generating an opposing force for opposing said vibration; and c) applying said variation in the angle of incidence as determined in this way to a control system for controlling the angle of incidence of at least a part of said tail fin, without applying alternating variation to the pitch of the blades of the tail rotor.

Thus, by generating said opposing force, it is possible in simple and effective manner to reduce said vibration having the drawbacks as mentioned above.

It should also be observed that the method of the invention is particularly effective in that it enables the effect of the aerodynamic excitation to be eliminated at source, i.e. at the tail fin itself, because of the way the angle of incidence of the tail fin is controlled. Consequently, the resonant modes of the fuselage can no longer be excited merely by interference between the pulsed and turbulent slipstream from the main rotor and from the air flow along the fuselage.

In addition, it should be observed that since the frequency of said vibration generally lies in the vicinity of a range extending from 5 hertz (Hz) to 6 Hz, or in said range, the frequency of the system for controlling variation in the angle of incidence of the tail fin can reach 20 Hz for example, in which case it is much higher than the frequency at which the tail rotor is maneuvered by the pilot (generally below 1 Hz) for yaw control, so that implementing the method of the invention has no consequences on yaw control of the helicopter.

In order to avoid applying control continuously and in order to take account only of the most important and most harmful part of the vibration, it is advantageous to apply frequency filtering to the vibration measurements, and in step b) of the method of the invention to take account only of the vibration measurements as filtered.

To this end, it is preferable to use a lowpass filter having a cutoff frequency situated in a range of about 20 Hz to 30 Hz.

In addition, for reasons of stability and safety, the amplitude of the opposing force is advantageously limited to a predefined value.

In addition, for reasons of maneuverability, and also in order to detect any degradation in the unbalance of the main rotor of the helicopter, the application of the method of the invention for reducing vibration can be interrupted so long as said helicopter is on the ground.

Similarly, application of the method can be deactivated while the helicopter is subjected to particular flight conditions.

When the method of the invention is applied to a helicopter having a tail fin that is substantially parallel to the plane of symmetry containing the longitudinal axis and the vertical axis of the helicopter, advantageously:

in step a), the lateral vibration that has been generated is measured at at least one location of the structure of said helicopter; and in step b), a lateral opposing force is generated to oppose said lateral vibration.

Under such circumstances, the tail fin may present one of the following characteristics:

it may be a single tail fin situated either substantially in the plane of symmetry of the helicopter, or substantially vertically at the outside end of a substantially horizontal stabilizer;

it may be two fins, in particular in one of the following configurations:

a V-shape at the rear end of the tail boom; or a substantially horizontal stabilizer made up of two aerodynamic surfaces located on either side of the tail boom, with each of the two outer ends of these aerodynamic surfaces being provided with a substantially vertical tail fin.

When there are two tail fins, the helicopter may also include a tail fin that is substantially vertical and that lies in the above-mentioned plane of symmetry.

When at least one tail fin is inclined at least in part relative to said plane of symmetry, then advantageously:

in step a), the lateral vibration and the vertical vibration that have been generated is measured at at least one location of the structure of said helicopter; and in step b), an opposing force is generated that presents a lateral component and a vertical component opposing said lateral vibration and said vertical vibration.

In which case, the tail fin presents at least one of the following characteristics:

there is a single fin at the rear end of the tail boom;

the tail fin comprises two fins in a V-shape, each of the limbs of the V-shape being at a particular angle of inclination relative to said plane of symmetry of the helicopter, the two fins possibly also being associated with a substantially vertical fin lying in said plane of symmetry.

Furthermore, in order to minimize any possible additional vertical vibration, at least one substantially horizontal stabilizer that is tiltable in angle of incidence is used to generate a vertical opposing force for opposing said vertical vibration. Consequently, this substantially horizontal stabilizer serves to counter the effects of vertical vibration either completely if none of the tail fins is inclined, or else in part when said vertical vibration is already reduced to some extent by means of at least one inclined tail fin.

The stabilizer is substantially horizontal and is remarkable in that it includes at least one of the following characteristics:

there is a single stabilizer on one side of the tail boom or on one side of a tail fin;

there are two stabilizers, with each stabilizer portion being situated on a respective side either of the tail fin or of the tail boom.

Advantageously, the method is also implemented to vary the angle of incidence of a portion only of a tail fin or of a stabilizer, i.e. of a flap located at the trailing edge of said tail fin or said stabilizer, with the span of said flap possibly being smaller than the span of said tail fin or of said stabilizer. Under such circumstances, the upstream portion of said tail fin or of said stabilizer is stationary.

It should also be observed that said lateral and/or horizontal vibration can be measured specifically on each tail fin and/or each substantially horizontal stabilizer so as to move each of those aerodynamic surfaces in such a manner as to avoid any excitation of resonant modes of the fuselage or of the tail boom under the effect of slipstream excitation.

The present invention also provides a device for reducing or even eliminating the vibration that is generated on the structure of a helicopter by the aerodynamic flow or slipstream through the main rotor for providing lift and propulsion to said helicopter, and/or by the air flow over the fuselage, said helicopter including at least one steerable tail fin at the rear end of the fuselage having an angle of incidence that is controlled by a control system.

According to the invention, said device is remarkable in that it comprises:
  at least one sensor suitable for measuring the vibration generated on the structure of said helicopter; and
  computer means arranged (programmed):
    to respond to said measurements to determine a variation in the angle of incidence of a tail fin suitable for generating an opposing force for opposing said vibration; and
    to transmit the variation in angle of incidence as determined in this way to said system for controlling the angle of incidence of said tail fin, without imparting alternating variation to the pitch of the blades of the tail rotor.

In a particular embodiment, said device advantageously additionally includes at least one substantially horizontal stabilizer that is tiltable and that has an angle of incidence that can be varied under the control of said computer means in order to generate a vertical opposing force for opposing said additional vertical vibration.

Said sensor may be constituted in particular by one of the following variants:
  an accelerometer;
  a gyroscope;
  a strain gauge;
  an angle of attack probe;
  a sideslip indicator; and
  a microphone for evaluating the aerodynamic environment of the tail fin and/or of the substantially horizontal stabilizer.

Advantageously, said sensor is disposed on the stationary portion of the steerable tail fin, and optionally on the stationary portion of the tiltable stabilizer.

The invention may be applied to a helicopter that does not have an (anti-torque) tail rotor.

BRIEF DESCRIPTION OF THE DRAWINGS

The accompanying figures show clearly how the invention can be implemented. In the figures, identical references are used to designate elements that are similar.

MORE DETAILED DESCRIPTION

Figure 1:
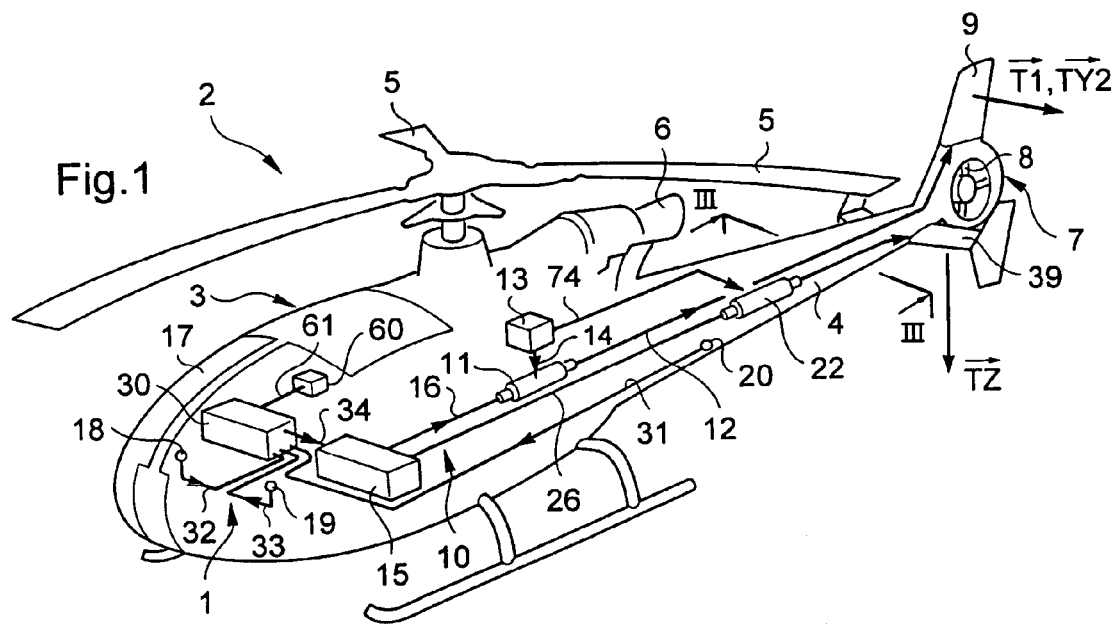
FIG. 1 is a diagram of a device in accordance with the invention mounted on a helicopter.

The device 1 of the invention and shown diagrammatically in FIG. 1 is intended to reduce vibration of the kind known as "tail shake", which vibration occurs in the structure of a helicopter 2, as described below.

As can be seen in FIG. 1, said helicopter 2 comprises:
  a fuselage 3 extended rearwards by a tail boom 4;
  a main rotor 5 for providing lift and propulsion that is driven by means of drive delivered by an engine 6;
  a tail rotor 7 provided in known manner with blades 8 serving to compensate the yaw torque of said main rotor 5; and
  a substantially vertical tail fin 9.

Said tail fin 9 used for providing said helicopter 2 with yaw stability can be steered in incidence by means of a control system 10 which comprises:
  an actuator 11 or the like (connected by a connection 12 to said tail fin 9, the connection being represented diagrammatically) powered by a power source 13 via a connection 14; and
  a control device 15 which issues control orders to said actuator 11 via a connection 16.

Figure 2:
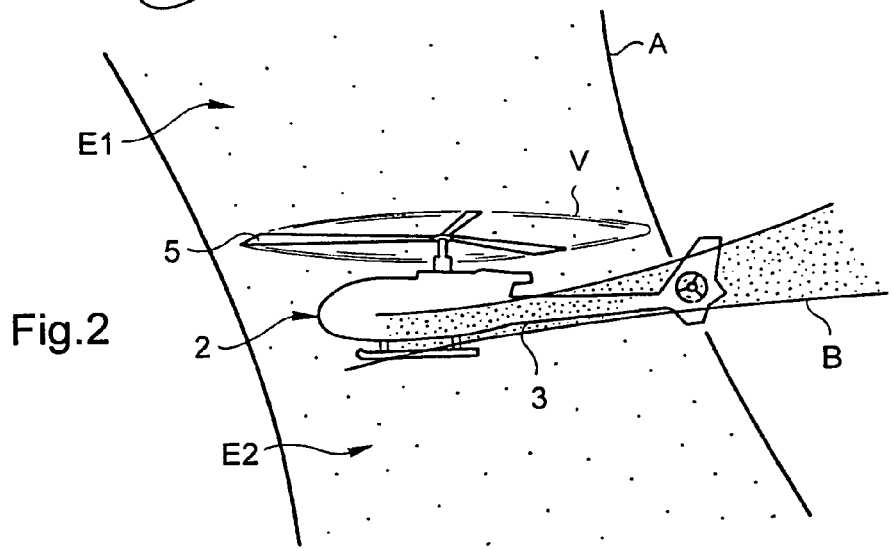
FIG. 2 is a diagram showing the slipstream formed by rotation of the main rotor and by the fuselage of a helicopter, thereby generating vibration.

In order to provide lift and forward drive for the helicopter 2, it is known that the main rotor 5 sucks in air from a space E1 situated above the helicopter and discharges it into a space E2 situated beneath it, with the air being accelerated. This establishes a slipstream A of moving air with varying pressure and speed, of a diameter at the helicopter 2 that is substantially equal to the diameter of the rotary wing V, as shown in FIG. 2. On coming into contact with the helicopter 2, this air flow or slipstream (A) and the air flow (B) along the fuselage 3 generate vibration in the structure 17 of said helicopter 2.

This vibration is mainly, but not exclusively, lateral vibration, and it is due mainly to the aerodynamic flow exciting resonant modes of the structure 17 of the helicopter 2, and in particular exciting the first lateral bending mode of the tail boom 4 of the helicopter 2.

The vibration due to this first lateral bending mode generally presents a frequency of a few hertz, and it is particularly troublesome.

The various kinds of vibration as generated in this way present drawbacks in particular in respect of the following:
  crew and passenger comfort;
  fatigue of parts and equipment; and
  the operation of weapons systems (not shown) if the helicopter 2 is fitted therewith.

The device 1 of the invention is intended to reduce said lateral vibration in order to remedy those drawbacks.

To this end, the device 1 comprises:
  sensors 18, 19, and 20 of known type, e.g. accelerometers, gyroscopes, strain gauges, angle of attack (AOA) probes, yaw probes, microphones, all mounted at various locations on the structure 17 of the helicopter 2 and suitable for measuring vibration generated at said locations of said structure 17; and computer means 30 connected via respective connections 31, 32, and 33 to said sensors 18, 19, and 20, and capable:
- of responding to said vibration measurements to determine a change in the angle of incidence of said tail fin 9 suitable for generating a force $\vec{T1}$ for opposing said vibration; and
- of applying the change of angle of incidence as determined in this way by means of a connection 34 leading to the control device 15 of said system 10 for controlling the angle of incidence of said tail fin 9.

Thus, existing vibration is reduced by the opposing force $\vec{T1}$ generated by controlling the angle of incidence of the tail fin 9.

Since the frequency of said opposing force $\vec{T1}$ is at least equal to the frequency of the vibration in question, i.e. 5 Hz to 6 Hz as mentioned above, the operation of the device 1 of the invention has no effect on controlling the helicopter 2 in yaw, where such control takes place at frequencies that are much lower, generally less than 1 Hz.

In addition, the device 1 of the invention makes it possible to limit the resonance of one or more resonant modes of the structure that are situated close to a harmonic of the frequency of rotation of the main rotor, and at which deformation of the tail boom of the helicopter 2 becomes large.

Furthermore, it is important to observe that by having at least one of the sensors 18, 19, and 20 on the tail fin itself, the excitation of the tail boom 4 can be cancelled since the corrective effect takes place at the tail fin 9 itself, which fin is subjected to the excitation produced by the slipstream. As a result, the structure of the helicopter as a whole is not subjected to the aerodynamic disturbances exerted on said tail fin 9.

Figure 3:
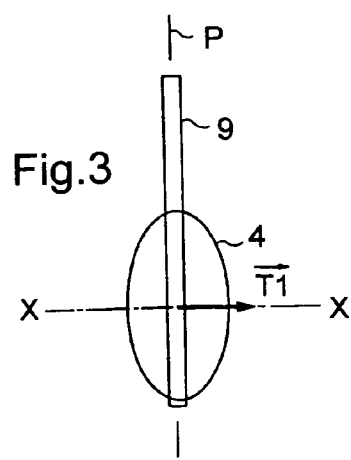
FIG. 3 shows a force opposing vibration generated on a helicopter whose tail fin is parallel to the plane of symmetry of said helicopter, using a diagrammatic cross-section on line III-III of FIG. 1.

As can be seen more clearly in FIG. 3, when the plane of the tail fin 9 is parallel to the plane of symmetry P of the helicopter, said opposing force $\vec{T1}$ generated along the axis X-X perpendicular to the plane P is lateral and suitable for preventing lateral vibration, which is the main part in the tail shake type physical phenomenon.

Under such circumstances, when the helicopter is subjected to vertical vibration in addition to said lateral vibration, the invention makes it possible to use a substantially horizontal stabilizer 39 (shown in FIG. 1) of angle of incidence that is controllable by said computer means 30, to generate a vertical opposing force $\vec{TZ}$ opposing said vertical vibration. Under such conditions, variation in the angle of incidence of the stabilizer 39 is applied to the control device 15 which, acting via a connection 26, delivers control orders to an actuator 22 powered by the power source 13 via a connection 74.

Figure 4:
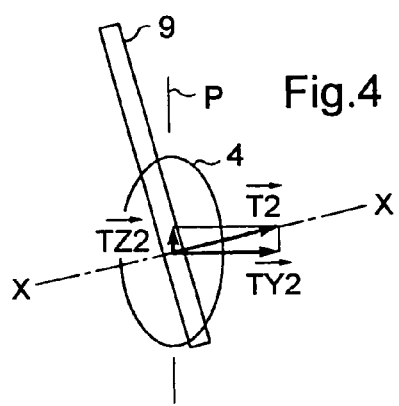
FIG. 4 shows a force opposing vibration, generated on a helicopter whose tail fin is inclined relative to the plane of symmetry of said helicopter.

Naturally, the present invention also applies to a helicopter 2 in which at least one of the tail fins slopes relative to the plane of symmetry P of the helicopter, as shown in FIG. 4.

To this end, variation in the angle of incidence of the tail fin 9 is determined suitable for generating an opposing force $\vec{T2}$ that presents a lateral component $\vec{TY2}$ and a component $\vec{TZ2}$ such that:

said lateral component $\vec{TY2}$ of the force $\vec{T2}$ effectively opposes said lateral vibration; and said vertical component $\vec{TZ2}$ of the force $\vec{T2}$ effectively opposes said vertical vibration.

Furthermore, said computer means 30 may incorporate filter means for frequency filtering the measured vibration so as to retain only vibration at a frequency that is below a determined frequency of the order of 20 Hz to 30 Hz. This serves in particular to avoid controlling said tail fin and/or said stabilizer on a quasi-continuous basis, by ignoring certain kinds of vibration that are negligible.

Alternatively, a bandpass filter could be used.

In a particularly advantageous embodiment, said computer means 30 may also be connected to means (not shown) serving to indicate when the helicopter 2 is on the ground so that said computer means 30 then transmits no control orders to the control device 15, for as long as said helicopter 2 remains on the ground. The device 1 of the invention is thus made inactive while on the ground, thus making it possible in particular to detect any possible degradation in the unbalance of the helicopter, where such detection would be impossible were the device 1 to be in operation.

Furthermore, in another particular embodiment that is not shown, it is also possible to provide for the device 1 of the invention to made inactive while in flight, on the appearance of particular flight conditions.

Figure 5:
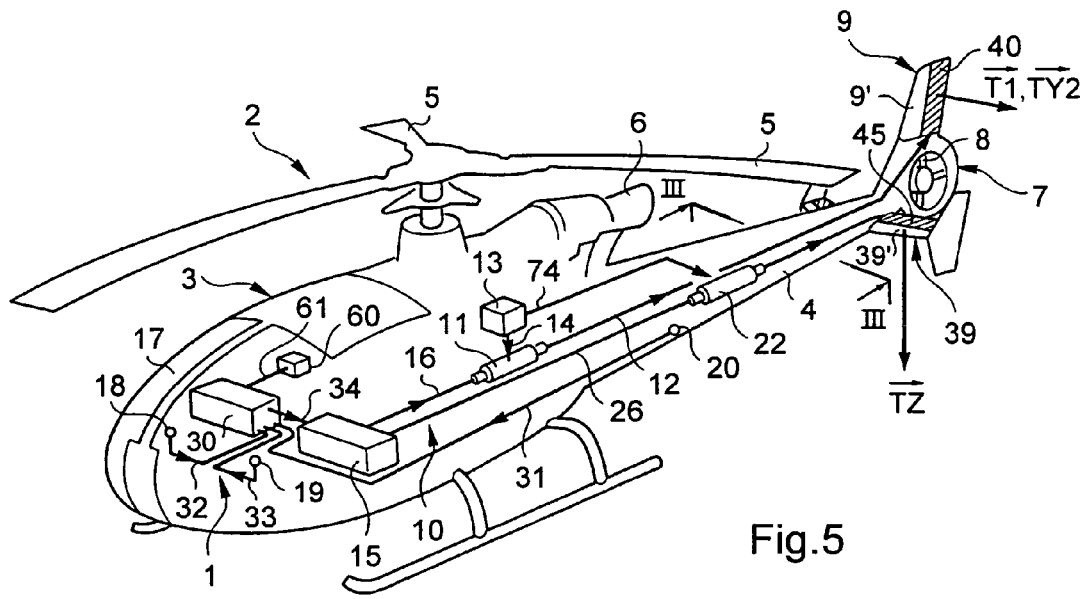
FIG. 5 is a diagram of a device of the invention implementing flaps on a tail fin and on a substantially horizontal stabilizer.

Naturally, and as shown diagrammatically in FIG. 5, a change of angle of incidence can be applied to a steerable tail fin implemented as a trailing edge flap 40 fitted to at least one of the vertical or sloping tail fins 9, and possibly by a tiltable stabilizer implemented by a flap 45 fitted to at least one substantially horizontal stabilizer 39, the upstream portion 9' of the tail fin 9 and the upstream portion 39' of the stabilizer 39 remaining stationary. These flaps are represented by shading in FIG. 5. Under such circumstances, the span of the flap may be shorter than that of the tail fin or the stabilizer.

It will also be understood that the invention can be implemented in variants such as the following, for example:

controlling angle of incidence for at least one complete tail fin 9 and for a flap 45 of at least one stabilizer 39;

controlling angle of incidence for at least one complete stabilizer 39 and for a flap 40 of at least one tail fin 9;

controlling angle of incidence for at least one complete tail fin 9 and for at least one complete stabilizer 39; and controlling angle of incidence for a flap 40 of at least one tail fin 9 and a flap 45 of at least one stabilizer 39.

Figure 6:
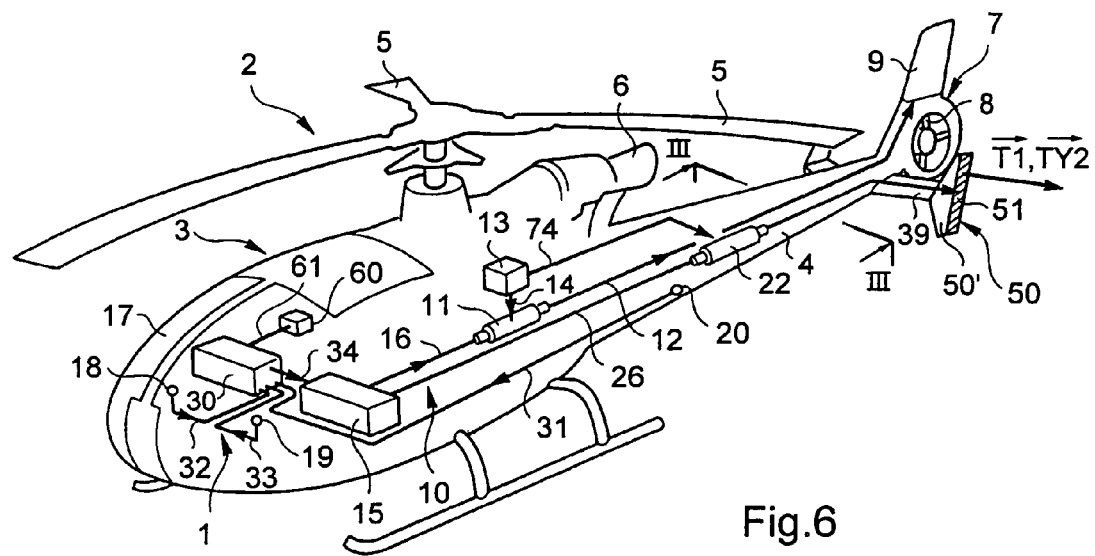
FIG. 6 shows the use of flaps of the invention disposed on two lateral tail fins, each of the tail fins being located at the outer end of a respective one of two substantially horizontal stabilizers disposed symmetrically about the plane of symmetry of the helicopter.

Furthermore, it is also possible to control the angle of incidence of a complete tail fin 50 located at each end of a stabilizer 39, for example, or the angle of incidence of flaps 51 fitted to such tail fins 50, in which case the upstream portions 51' are then stationary, as shown in FIG. 6.

Naturally, these tail fins 50 may also be in a V-shape (not shown) taking the place of the tail fin 9 or in addition to the tail fin 9.

Similarly, it will be understood that varying the angle of incidence of a tail fin 9, 40, 50, 51, and possibly also varying the angle of incidence of a substantially horizontal stabilizer 39, 45 needs to be adapted to each configuration of tail fin and stabilizer and to each flight configuration.

For this purpose, the computer means 30 make use of information relating to each flight configuration, namely, for example: the vertical and horizontal speeds and the attitudes and positions of the helicopter. This information is picked up by sensors 60 for sensing flight configuration (or stage) parameters and delivered to the computer means 30, with the sensors 60 being connected via a connection 61 to said computer means 30.

Under such conditions, said sensors 18, 19, 20 may advantageously be fixed to said tail fin 9, 40, 50, 51 that is steerable, at least in part, and to said tiltable stabilizer 39, 45; said sensor(s) is (are) advantageously fixed to a stationary part of said tail fin and of said stabilizer.

In a preferred embodiment, the travel speed of the helicopter through the air is measured using an indicated air speed (IAS) sensor; and the gain with which changes in the angle of incidence of the tail fin, and where appropriate of the horizontal stabilizer, is caused to vary as a function of the measured speed.

In a particular embodiment, when the air speed exceeds a predetermined threshold value, said gain G is inversely proportional to the square of the air speed, in particular in application of the following equation:

$$G = \frac{k}{IAS^2} \times (M + \varphi)$$

where $\underline{k}$ is a constant, M is the (filtered) measured vibration, and $\varphi$ is a phase offset that is selected or continuously modified in order to minimize the amplitude of the measured vibration.

Naturally, the present invention is capable of numerous variations as to its implementation. Although several embodiments are described above, it will readily be understood that it is not conceivable to identify all possible embodiments in exhaustive manner. Naturally, it is possible to envisage replacing any of the means described by equivalent means without thereby going beyond the ambit of the present invention.

What is claimed is:

1. A method of reducing vibration in a structure of a helicopter having a main rotor and a tail boom with a steerable tail fin and a tail rotor, comprising the steps of:

exciting a lateral vibration in the tail boom of the helicopter with a downward flow of air from the main rotor onto the structure of the helicopter, the downward flow of air having a diameter substantially equal to a diameter of the main rotor and having varying pressure and speed;

measuring the lateral vibration on at least one location of the helicopter;

determining a variation of an angle of incidence of a movable control surface of the tail fin that generates a force opposing the measured lateral vibration; and varying the angle of incidence of the movable control surface of the tail fin the determined variation to generate the force opposing the measured lateral vibration without applying alternating variation to a pitch of blades of the tail rotor.

2. The method of claim 1, wherein the generated lateral vibration is a first lateral bending mode of the tail boom.

3. The method of claim 1, wherein the generated lateral vibration has a frequency of 5 to 6 Hz.

4. The method of claim 1, wherein the method is inoperable when the helicopter is on the ground and in particular flight conditions.

5. The method of claim 1, wherein the at least one location where the lateral vibration is measured is on the tail fin.

6. The method of claim 1, further comprising the steps of exciting a vertical vibration in the structure of the helicopter, measuring the vertical vibration on at least one location of the helicopter, determining a variation of an angle of incidence of a part of a substantially horizontal control surface that generates a force opposing the measured vertical vibration, and varying the angle of incidence of the part of the substantially horizontal control surface the determined variation to generate the force opposing the measured vertical vibration.

7. The method of claim 1, further comprising the step of filtering the measured lateral vibration.

8. The method of claim 1, further comprising the step of limiting an amplitude of the force opposing the measured lateral vibration.

9. The method of claim 1, wherein the tail fin is parallel to a plane of symmetry of the helicopter.

10. The method of claim 1, wherein the tail fin is inclined relative to a plane of symmetry of the helicopter.

11. The method of claim 1, wherein the movable control surface of the tail fin is a trailing edge flap that is hinged to a stationary upstream part of the tail fin.

* * * * *